(12) United States Patent  
Leegate et al.

(10) Patent No.: US 8,425,073 B1  
(45) Date of Patent: Apr. 23, 2013

(54) ILLUMINATION/MARKER SYSTEM MOUNTED ON A PARACHUTE SLIDER

(76) Inventors: Gary Leegate, Clearwater, FL (US); Marcia Baldwin, Clearwater, FL (US)

( * ) Notice: Subject to any disclaimer, the term of this patent is extended or adjusted under 35 U.S.C. 154(b) by 0 days.

(21) Appl. No.: 13/586,027

(22) Filed: Aug. 15, 2012

(51) Int. Cl.
*B64D 17/00* (2006.01)
*F21V 21/008* (2006.01)

(52) U.S. Cl.
USPC ............ 362/108; 362/253; 362/276; 244/142

(58) Field of Classification Search ................. 362/108, 362/253, 190, 276, 191; 342/8, 10; 244/142
See application file for complete search history.

(56) References Cited

U.S. PATENT DOCUMENTS

| | | | | |
|---|---|---|---|---|
| 1,842,433 | A | * | 1/1932 | Terwilliger ................. 338/262 |
| 2,309,105 | A | * | 1/1943 | Dircksen ................. 244/138 R |
| 2,376,330 | A | * | 5/1945 | Dircksen et al. ......... 340/815.66 |
| 3,323,117 | A | * | 5/1967 | Mason .......................... 340/321 |
| 3,655,151 | A | | 4/1972 | Ferguson |
| 5,005,785 | A | | 4/1991 | Puskas |
| 5,530,445 | A | | 6/1996 | Veazey |
| 6,464,173 | B1 | | 10/2002 | Bandak |
| 7,046,160 | B2 | * | 5/2006 | Pederson et al. ......... 340/815.45 |
| 8,360,594 | B2 | * | 1/2013 | Sant et al. ..................... 362/106 |
| 2010/0097791 | A1 | * | 4/2010 | Chang .......................... 362/190 |

FOREIGN PATENT DOCUMENTS

GB 2421229 * 6/2006

* cited by examiner

*Primary Examiner* — Peggy A. Neils
(74) *Attorney, Agent, or Firm* — Thomas Frost

(57) ABSTRACT

An illumination/marker system mounted on a parachute slider is shown for identification, tracking, and collision avoidance in manned and unmanned parachute operations. The system includes a variety of emission/radiation sources (luminaires), and positioned at pre-determined locations on the parachute slider. A battery provides the power source. System activation means are provided automatically upon deployment of a parachute and/or slider, and/or other sensory inputs such as altitude, motion, time, or photometrics, or manual action, on demand, by the parachutist. System deactivation means provide sensory inputs or on demand by the parachutist.

9 Claims, 13 Drawing Sheets

ILLUMINATION/MARKER SYSTEM MOUNTED ON A PARACHUTE SLIDER

BACKGROUND OF INVENTION

The present invention relates to a visual, infrared, or other wavelength illumination/marker system mounted onto the slider portion of parachute systems for identification, tracking and/or collision avoidance for parachute-borne individuals and parachute-borne aerial delivery loads, manned or unmanned.

Previously, visual, infrared, or other wavelength illumination and marking systems for identification, tracking and/or collision avoidance of parachute-borne individuals and/or parachute-borne equipment during night or covert operations have relied on separate, non-integral devices (generally visible and infrared) such as flashlights, strobe lights, beacons, and chemical light sticks which are mounted on parachute-borne personnel, parachute-borne equipment loads, or to the parachute canopy itself. Illumination means for visual identification incorporated in parachute canopies is known in the prior art.

This invention mounts an illumination/marker system for identification, tracking and/or collision avoidance on a parachute slider, a feature of most ram-air parachute systems which is designed to increase the reliability of parachute opening and reduce opening forces. The slider is a generally rectangular assembly of strong, lightweight technical cloth, reinforced on its edges and corners to support four large grommets at each corner through which the lines attaching the parachute canopy to the parachutist or aerial delivery load are extended. The slider functions as a method to manage the four sets of parachute lines between the parachute canopy and the parachutist or load and to control the opening of the canopy. In the packed, ready-to-deploy condition, the slider is located well up the four sets of parachute lines and close to the canopy. During inflation of the canopy, the slider is forced down the four sets of parachute lines to an equilibrium point defined by the transition point between the parachute lines and the respective parachute risers which are connected directly to the parachutist or load. This equilibrium point is just above the parachutist or load, and below the parachute canopy. When the slider is fully deployed a barrier is created which can obstruct visible light, infrared (IR), or other radiation from a parachutist-mounted or load-mounted lighting device and obstruct the illumination the parachute canopy.

The invention mounts an illumination/marking system onto the slider itself, changing it from a barrier to visible light, infrared (IR), or other wavelength emissions from the parachutist or load to become a platform for the actual source of such emissions in order to facilitate and enhance illumination and marking for identification and tracking by other parachutists or aircraft or ground personnel, and collision avoidance for and by other parachutists or aircraft by providing (a) direct, line-of-sight to the source of the illumination (luminaires), (b) direct illumination of the slider surface itself, and/or (c) direct illumination of the parachute canopy and/or the parachute lines.

It is an object of the invention to provide an illumination/marking system mounted onto a slider, either permanently integrated or as a semi-permanent or temporary addition to the slider.

It is another object of the invention to provide an illumination/marking system which deploys and activates automatically upon inflation of the parachute canopy and/or deployment of the slider, or by other pre-programmed sensory inputs such as altitude, change of motion, or time, or manually by the parachutist.

It is another object of the invention is to provide self-contained battery power to the illumination elements of the system (the luminaires) by using a variety of means to switch the battery power circuit from an electrically open circuit (OFF) condition to a closed circuit (ON) condition such means to include but not necessarily be limited to electrical switching means such as mechanical proximity switches, magnetic/reed and Hall Effect switches, and electrical or power contact insulation and/or interruption devices.

It is another object of the invention to provide an automatic system activation means which causes power to be delivered from the battery to the luminaire(s) as a result of deployment of the parachute or the slider, such means to include but not be limited to (a) pulling the parachute rip-cord to initiate parachute deployment, (b) physical opening of parachute or slider containment means, (c) a short-rigged pull lanyard or tab that pulls out of device when the slider is fully extended from its packed/folded condition, (d) the playing out of parachute lines during canopy opening, and/or (d) strain sensing devices that sense the extension, elongation, or stretching of substrates or lines.

It is another object of the invention to provide the ability to activate the system automatically by a variety of sensory inputs including change of motion sensing via on-board accelerometer, altitude sensing via an on-board pressure sensor, settable timers, and photometric (day/night) sensors.

It is another object of the invention to provide a manual system activation means which causes power to be delivered from the battery to the luminaire(s) as a result of manual action, on demand, by the parachutist, such as pulling an activation tab attached to the slider and/or the installed illumination/marking system.

It is another object of the invention to provide one or more illumination sources (luminaires) within the system that emit radiation in the visible, infrared (IR), or other wavelength spectra for marking and recognition by (a) the human eye directly or through enhancement means such as night vision (infrared) devices, or (b) by electronic equipment with sensors designed for acquiring and tracking such emissions/radiations.

It is another object of the invention to provide different types of marking and/or identification signals to enable visual or electronic-assisted identification, tracking or collision avoidance including (a) direct emission/radiation from the luminaires, or (b) illumination of the surface defined by the inflated volume of the slider and/or (c) illumination of the parachute canopy and/or its parachute lines.

It is another object of the invention to provide a battery holder for securing a replaceable and/or rechargeable battery cell or battery assembly to provide power to the luminaires.

It is another object of the invention to provide a means, such as conductive wires, of transferring power to luminaires that may be remote from the battery.

It is another object of the invention to provide electronic circuitry mounted on printed circuit board(s) at the battery, luminaire, and/or other location(s) which provide for and/or facilitate system arming, activation, de-activation, power control, selection of type and format of emission, and any other functions necessary for the intended system operation, function, and mission.

It is another object of the invention to provide a deactivation feature whereby the system can be disabled or turned OFF either manually by the parachutist or automatically by a variety of means on manned or unmanned parachute operations according to pre-established mission requirements, such means including but not limited to altitude sensing, change of motion sensing (accelerometer), or settable timer.

It is another object of the invention to provide a variety of means of attachment of the various system elements (e.g, battery, battery holder, printed circuit board(s), luminaire(s), interface wiring, activation means) to the slider in order to properly contain and/or secure those elements for integral/permanent, semi-permanent, or temporary installation in a manner that does not interfere with proper deployment of the parachute and the slider.

It is another object of the invention to provide for a variety of means of combining or distributing the various elements of the system (e.g, emission source, power source, control circuitry, and activation means) to form the most viable configuration for the particular equipment on which it is to be installed; such configurations could include but not be limited to (a) separate locations for each element, (b) combinations of one or more elements into one or more location, or (c) complete integration of all elements into one independent device which can be installed in one or locations.

SUMMARY OF THE INVENTION

The general purpose of the present invention, which will be described subsequently in greater detail, is to provide an illumination system for identification, marking, and/or tracking mounted on a slider used with certain types of parachutes To attain this, the present invention mounts on a slider of a generally rectangular shape comprised of strong, lightweight technical cloth, reinforced on its edges and corners to support four large grommets at each corner through which lines attaching the parachute canopy to the parachutist and/or aerial delivery load (load) are extended. The grommets are integrally formed within binding formed on the perimeter of the slider. An illumination system comprising one or a plurality of luminaires, emitting radiation in the visible, infrared (IR), and/or other wavelength spectrum, is mounted on the edge binding or other cloth structure of the slider. A luminaire consists of an emission/radiation source such as incandescent, light-emitting diode (LED), fluorescent, or electro-luminescent emitters and a protective covering.

A main printed circuit board, along with a battery and battery holding means (battery holder), is mounted on the slider juxtaposed preferably the leading or trailing edge of the slider. Activation circuit switching means provide a means for changing the state of the emitter/battery circuit from a normally open circuit (OFF) to a closed circuit (ON) condition. Electrical wiring and other means connect the battery power source, circuits and emission/radiation sources. The electrical wiring is secured and covered in such a manner as to preclude interference with parachute and/or slider during deployment and flight.

An electronic circuit located on the printed circuit board(s) provides for emitter function control, emitter intensity control, and power regulation and deactivation or activation circuitry.

Mechanical system activation means, such as a short-rigged lanyard connected to a switching means, activate the system upon deployment of the parachute and/or slider, or manually by the parachutist. The switching means causes the battery power circuit to be changed from an open circuit (OFF) condition to a closed circuit (ON) condition. The emitters are turned ON and OFF based upon battery power being applied or removed either directly or by pre-programmed instructions.

Automatic system activation means, such as change of motion sensing via an on-board accelerometer, altitude sensing via an on-board pressure sensor, settable timer, photometric (day/night) sensors.

Once activated the emission sources on the slider facilitate and enhance visual or electronic marking for identification, collision avoidance or tracking. The system provides different types of visual, infrared (IR), or other wavelength marking and/or identification signals to enable (a) identification and tracking of specific individuals such as the team leader or other team members by other parachutists (b) identification and tracking of manned or unmanned aerial delivery loads relative to other parachutists in the immediate air space, (c) collision avoidance with other parachute-borne individuals and/or aerial delivery loads in the immediate air space, (d) visual or electronic tracking of parachute-borne individuals and/or loads by airborne or ground observers or sensors. There is direct line-of-sight emission from the luminaires; direct illumination of the parachute canopy and/or parachute lines by the upward component of the projected light/emission; direct illumination of the bottom surface of the parachute canopy; bleed-through illumination of the top surface of the parachute canopy and direct or bleed-through illumination of the surface/structures of the slider.

BRIEF DESCRIPTION OF THE DRAWINGS

The invention will be better understood and objects other than those set forth above will become apparent when consideration is given to the following detailed description thereof. It should be noted that these drawings represent one embodiment of an illumination, identification, and marking system designed for installation on a parachute slider. Such description makes reference to the annexed drawings wherein.

DETAILED DESCRIPTION OF THE INVENTION

Figure 1:
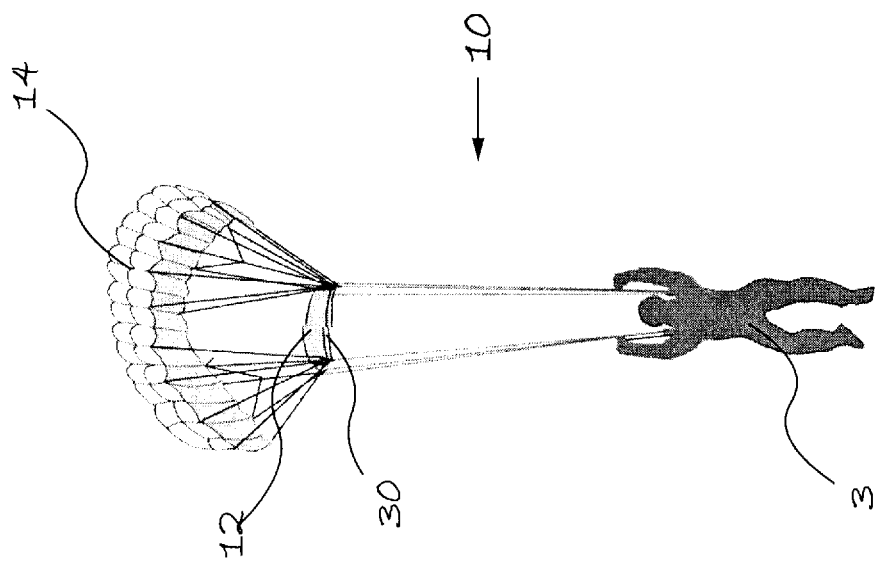
FIG. 1 is a view of the invention with a parachute canopy partially deployed.

Referring to the drawings FIGS. 1 to 7, generally, representative embodiments of the present invention 10 will now be described in greater detail. A slider 12 of a generally rectangular shape comprised of strong, lightweight technical cloth, reinforced on its edges and corners to support four large guide grommets 24 at each corner through which parachute lines 26 and parachute risers 28 attaching to a parachute canopy 14 to the parachutist or aerial delivery load (load) are extended. The grommets 24 are integrally formed within binding formed on the perimeter of the slider 12. The slider 12 has a main body 16 with edge binding 22. The slider 12 has a leading edge 18 and a trailing edge 20. The main body 16 is preferably comprised of fabric.

Figure 2:
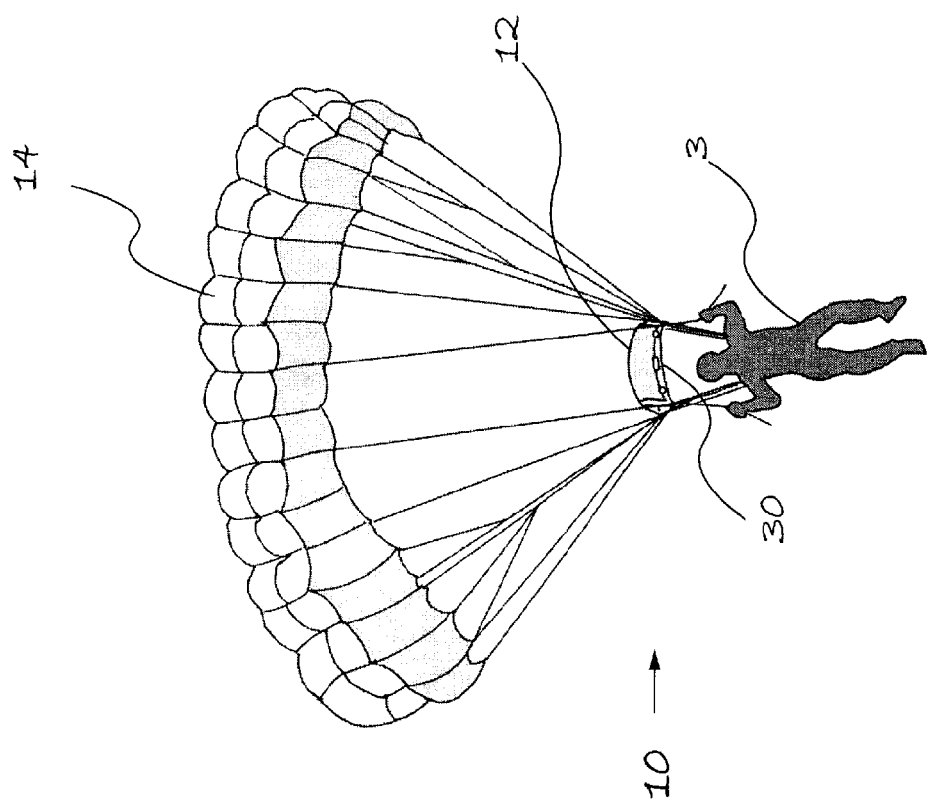
FIG. 2 is a view of the present invention with the parachute canopy and parachute slider fully deployed.
Figure 3:
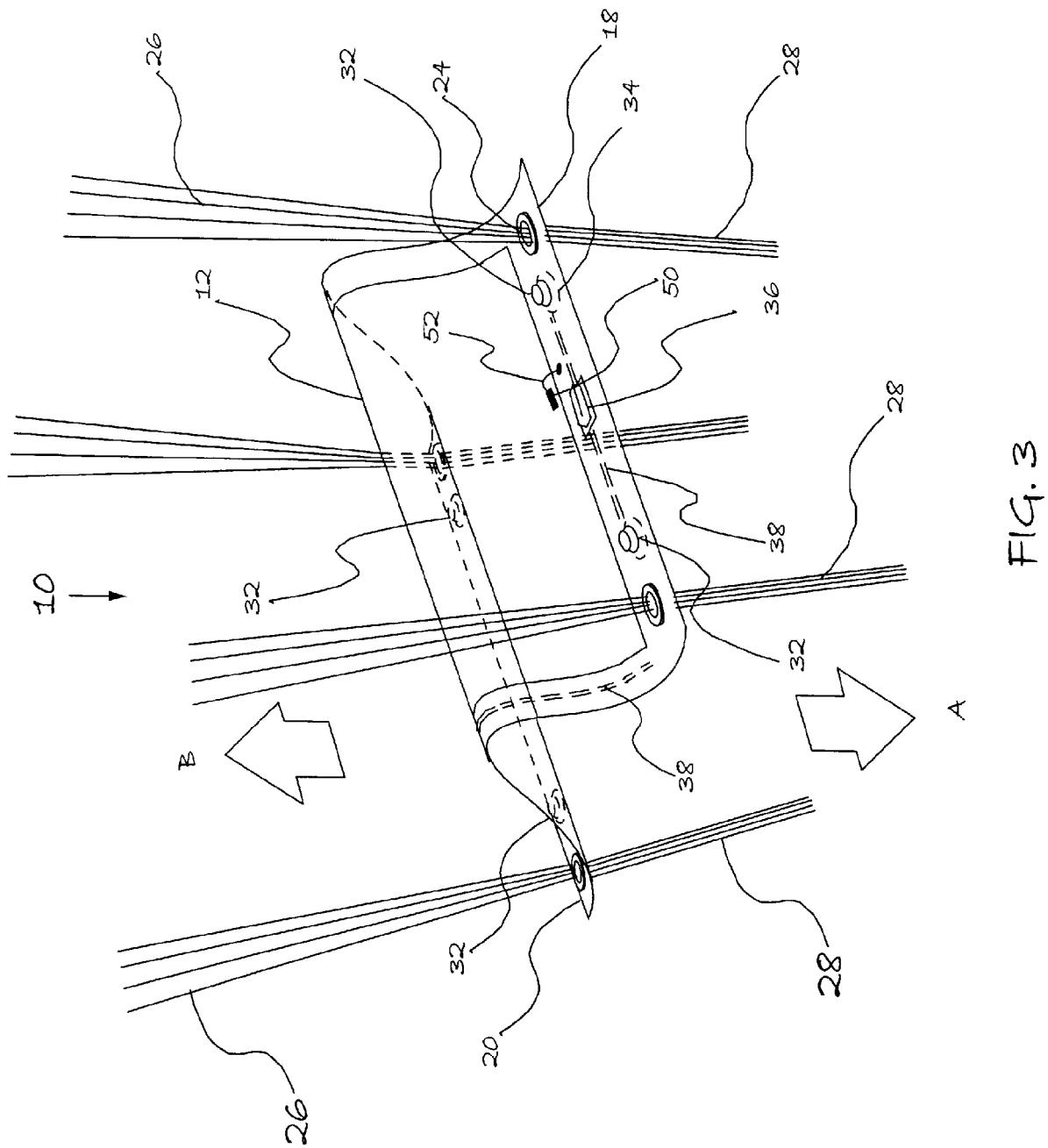
FIG. 3 is a front perspective view of the present invention.

The deployment of the slider 12 is illustrated in FIGS. 1 and 2. In FIG. 1 the parachute canopy 14 and the slider 12 are partially deployed. The slider 12 is located close to the canopy 14 in its packed condition prior to deployment, and moves down the lines 26 as the canopy 14 inflates. As shown in FIG. 2, as the canopy 14 inflates, the slider 12 moves to an equilibrium point juxtaposed the parachutist or load. During the canopy 14 inflation and slider 12 deployment sequence, the slider 12 extends from a tightly folded and packed condition to a fully extended condition with the leading edge 18 and trailing edge 20 pulled taut by the parachute lines 26 and the main body 16 of the slider inflated by air, much the same as the canopy 14. FIG. 3 illustrates the slider during partial deployment with arrow A denoting direction to the parachutist or load, and arrow B denoting direction to the parachute canopy.

Figure 10:
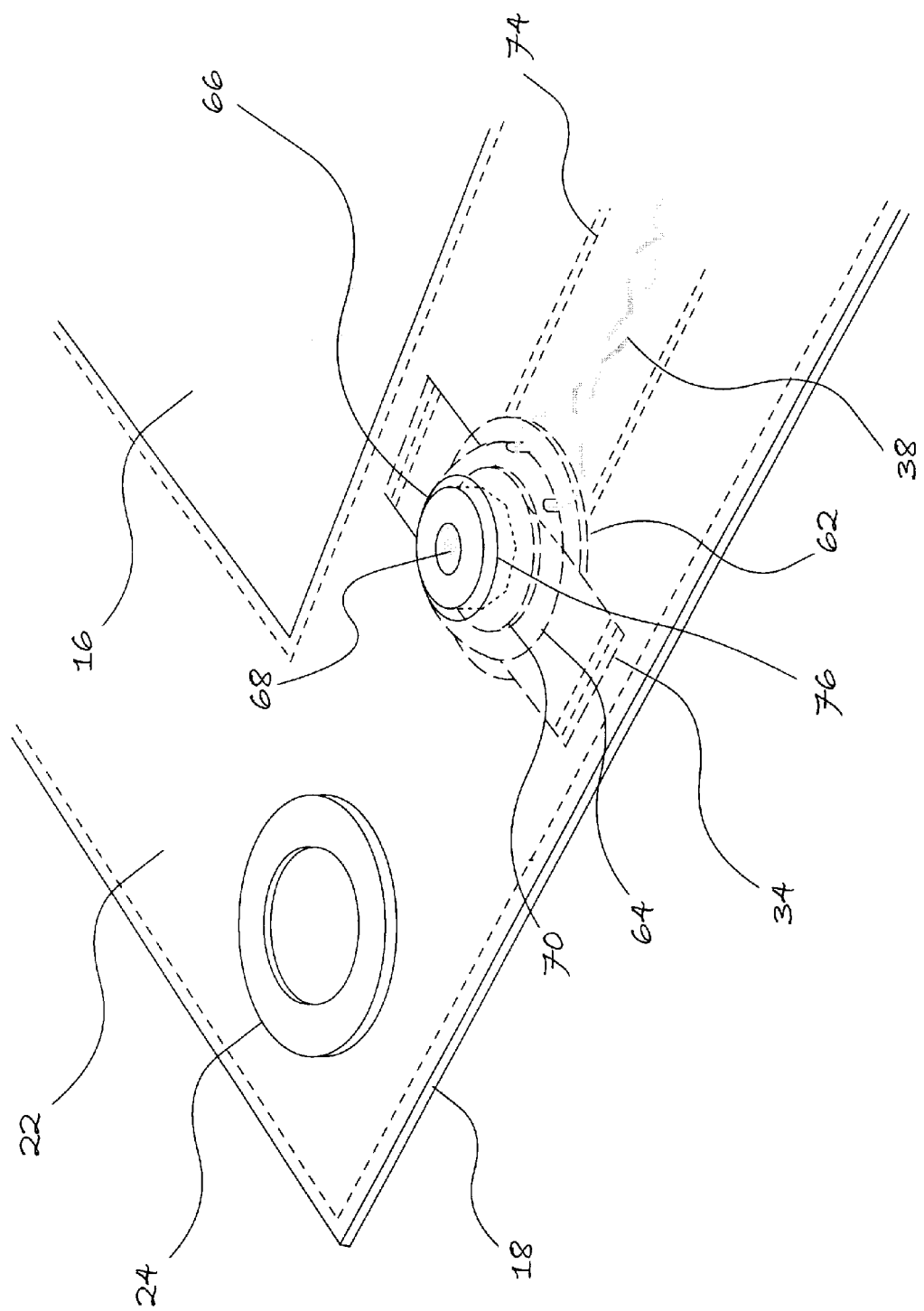
FIG. 10 is a second partial view of the first embodiment of the present invention.
Figure 11:
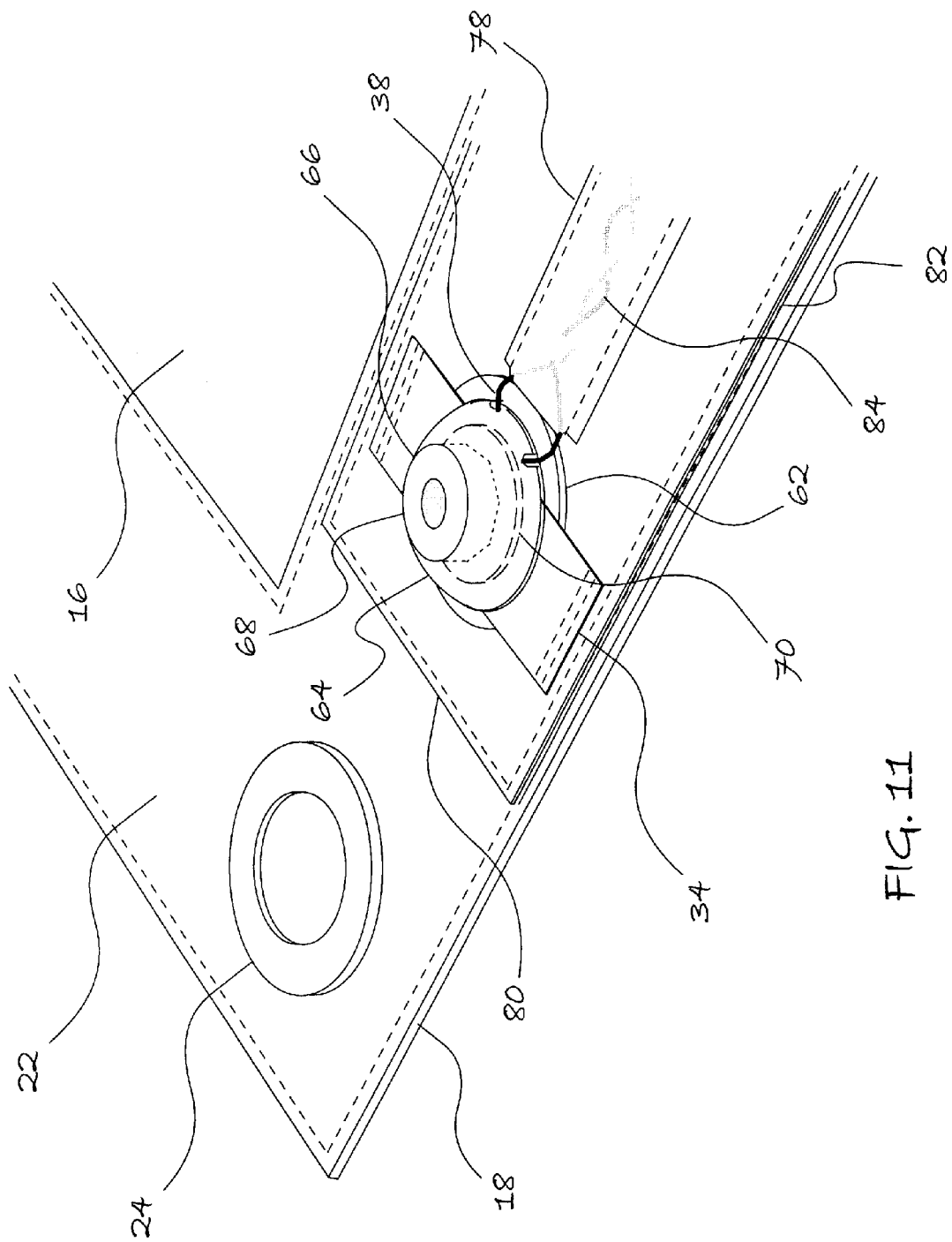
FIG. 11 is a second partial view of the second embodiment of the present invention.
Figure 12:
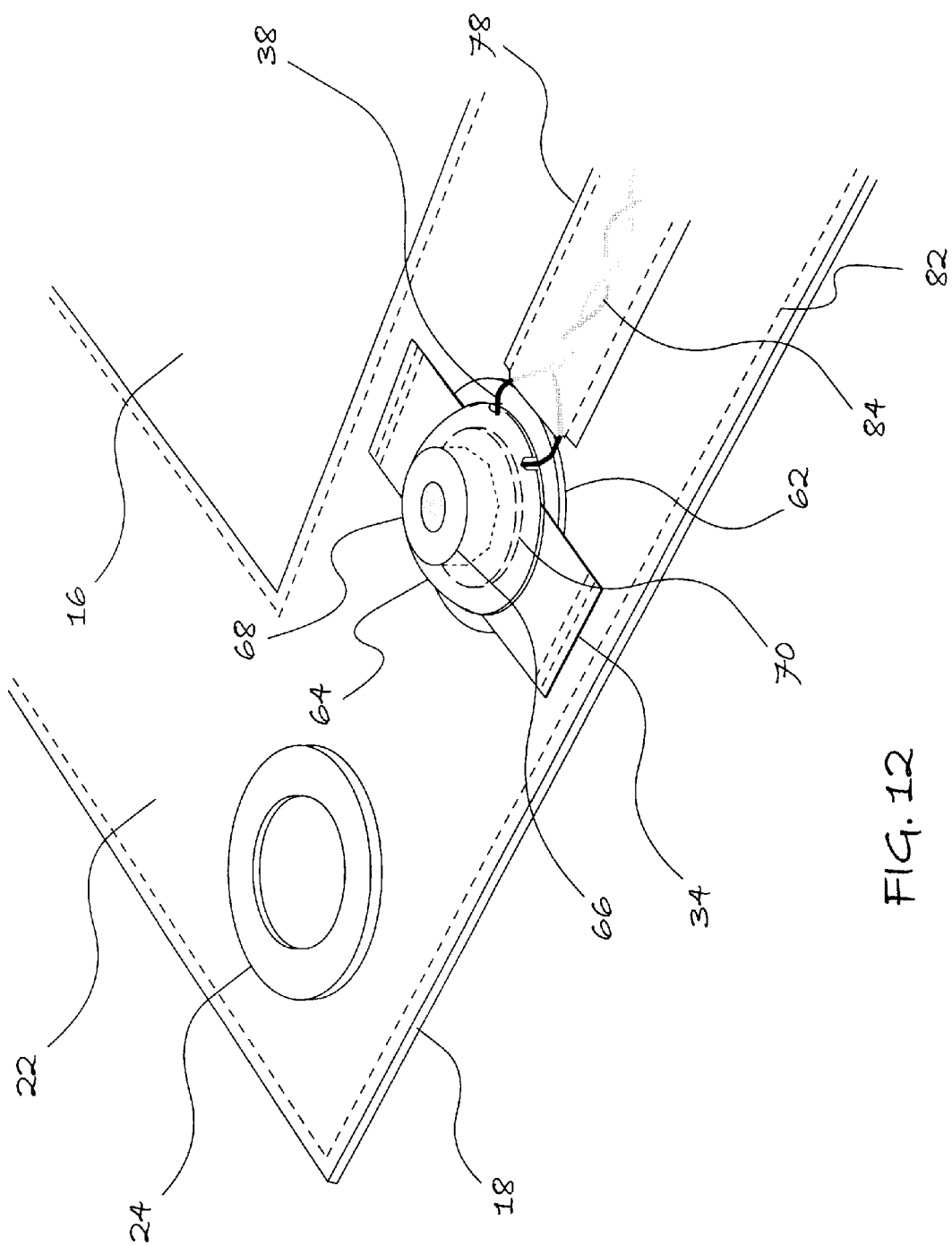
FIG. 12 is a partial view of a third embodiment of the present invention.

An illumination system 30 is disposed on the slider 12 at a pre-determined location. The illumination system 30 is comprised of a power source, at least one luminaire 32, activation circuit switching means and system activation means. The system 30 can be permanently sewn into the edge binding 22 when the slider 12 is made (as illustrated in FIG. 10), be semi-permanently installed (as shown in FIG. 11) or temporarily mounted (as shown in FIG. 12). The system 30 can be disposed on an upper or lower surface juxtaposed the leading edge 18 of the slider 12, disposed on an upper or lower surface juxtaposed the trailing edge 20 of the slider 12 or disposed on an upper or lower surface of the main body 16 of the slider 12 centrally located. The system 30 and its components are mounted, secured, and/or covered on the slider 12 to insure that there is no interference or entanglement with the slider 12, the parachute canopy 14, the parachute lines 26, or any other piece of equipment within the packed or deployed parachute system.

As shown, particularly in FIGS. 10-12, the system 30 includes at least one luminaire 32 temporarily positioned on, or permanently integrally formed with, the slider 12. The luminaire 32 is an emission/radiation source within a protective/containment means or housing which may comprise a base 62 and a lens 64. An optional luminaire attachment means 34 is permanently engaged between the base 62 and the lens 64, with the means 34 assisting in securing the luminaire 32. An emitter light source 68 is disposed in the luminaire 32. The housing of the luminaire 32 will be clear to provide the most optimum transmission from the emitter light source 68, and may be configured or treated in such a way as to provide enhanced or specialized transmission from the emitter to enhance visibility and acquisition. The luminaire 32 provides containment and protection of the emitter light source 68 and a safe, protected interface between the emitter and slider 12. Luminaire light output reflectors or diffusers 66 are positioned juxtaposed the emitter light source 68. The luminaire 32 further comprises a luminaire printed circuit board 70 which operates in conjunction with or may comprise all of the functions of a main circuit board 48. Optional features of the luminaire 32 are mounting patches or flanges which facilitate attachment to and security within the slider 12.

Figure 4:
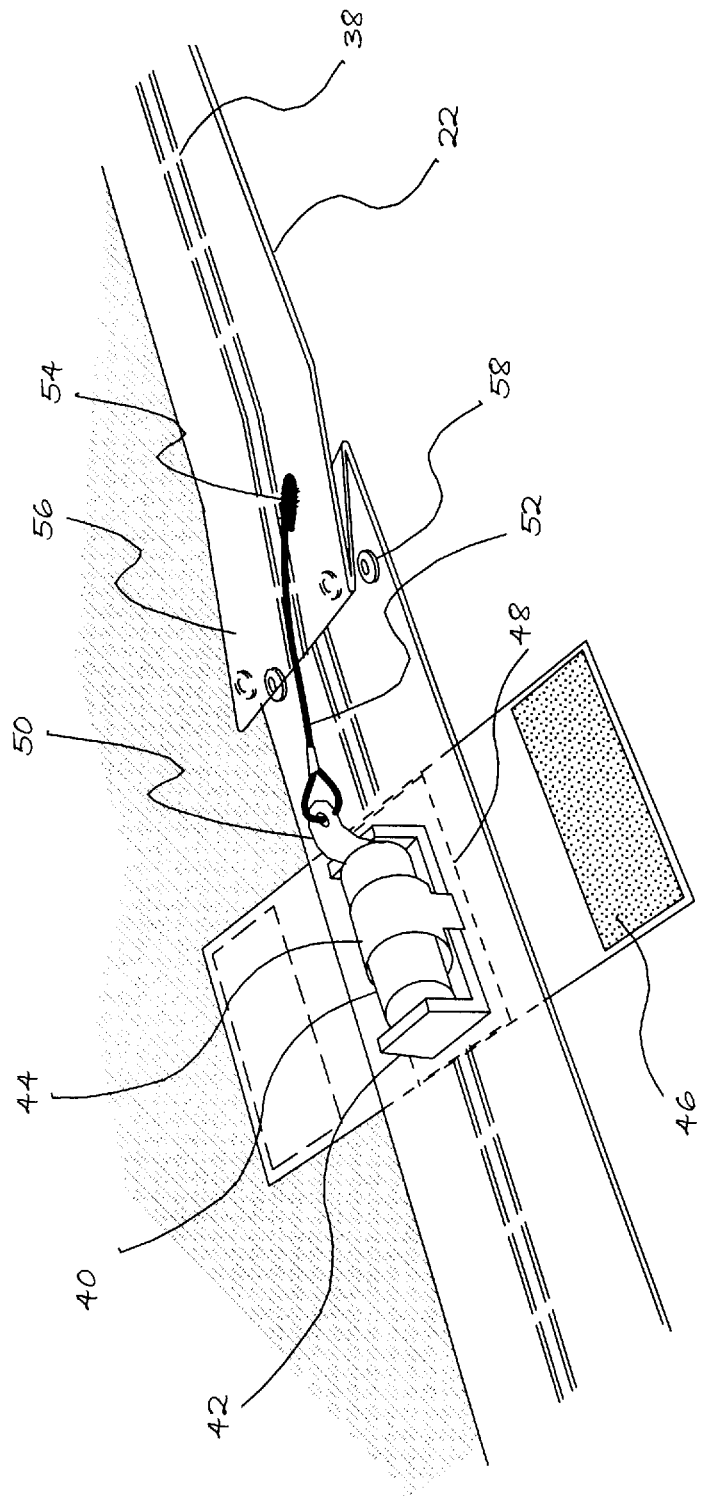
FIG. 4 is a front view of a power source, an activation tab and a lanyard of the present invention.
Figure 5:
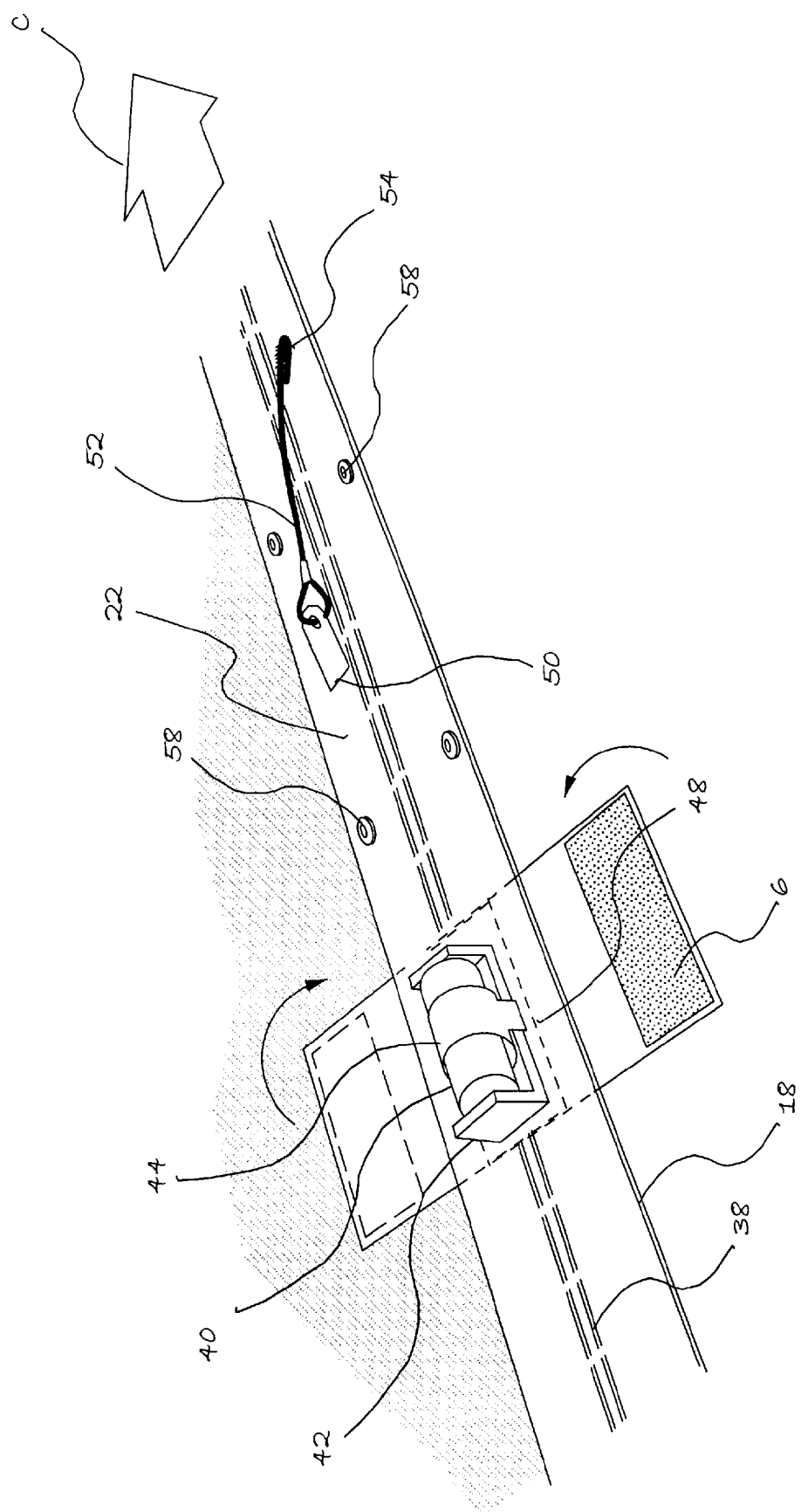
FIG. 5 is a front view of the system activation means of the present invention changing the switching means to a closed circuit.
Figure 6:
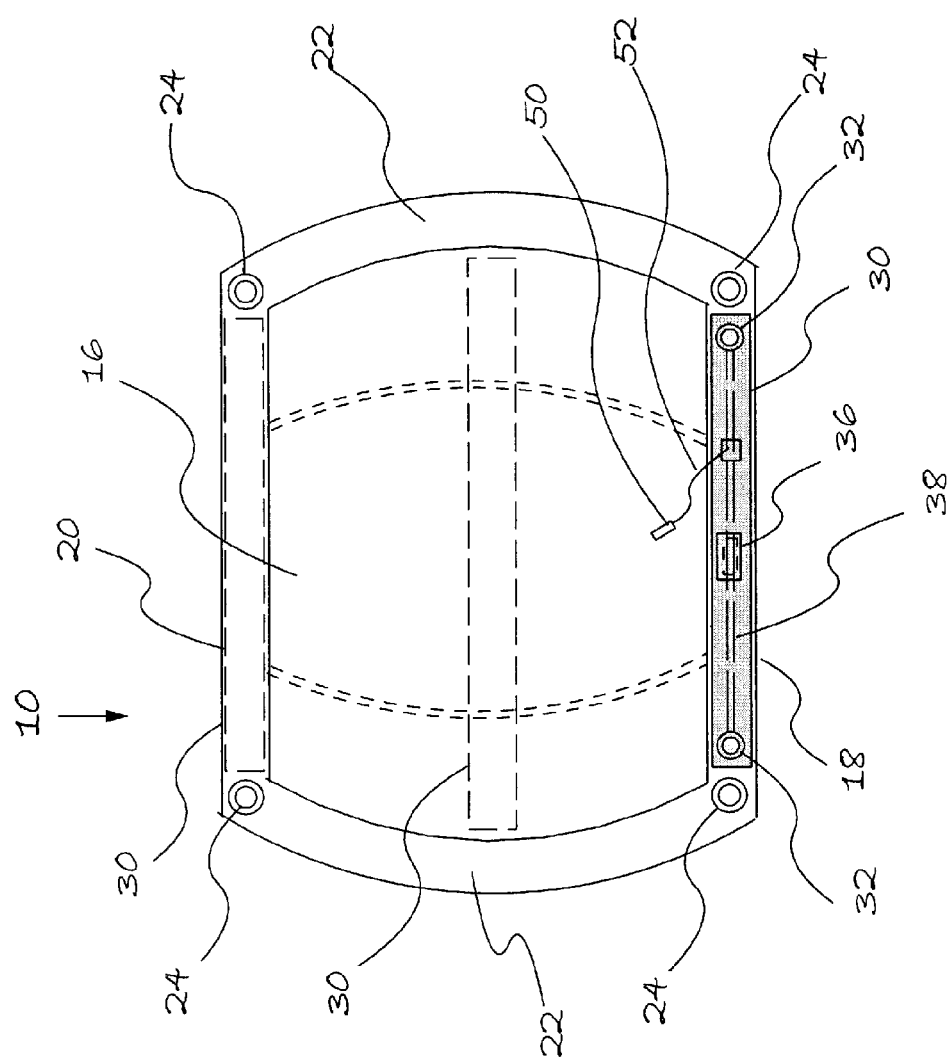
FIG. 6 is a top plan of the present invention.
Figure 7:
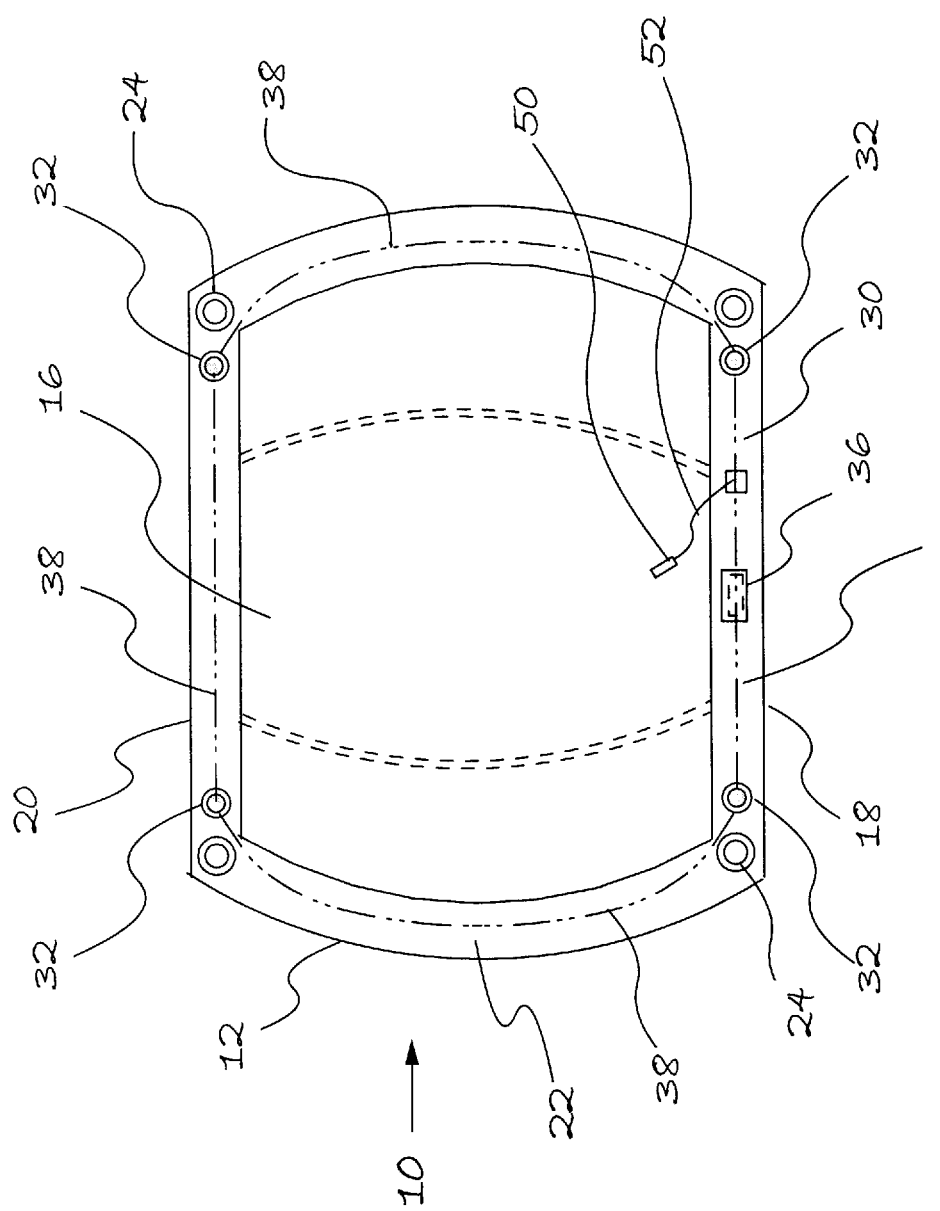
FIG. 7 is another top plan view of the present invention.
Figure 8:
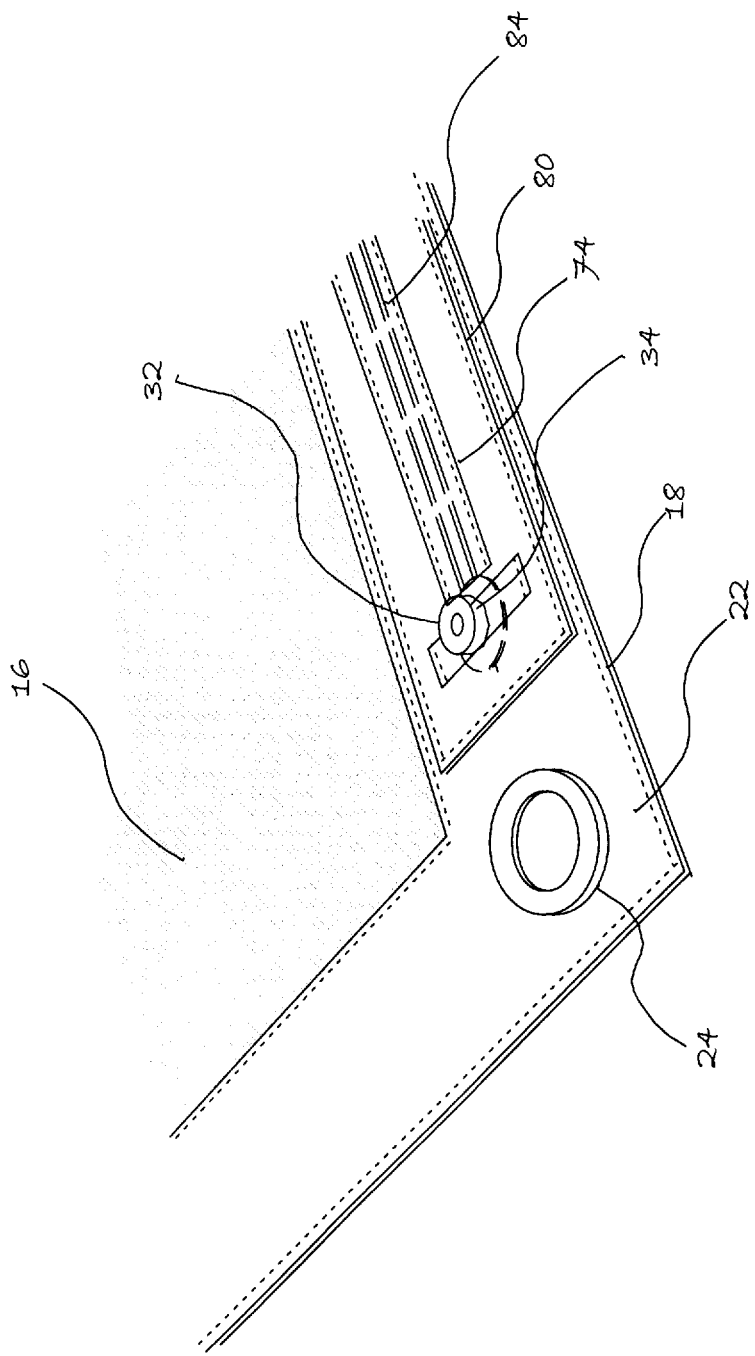
FIG. 8 is a partial view of a first embodiment of the present invention.
Figure 9:
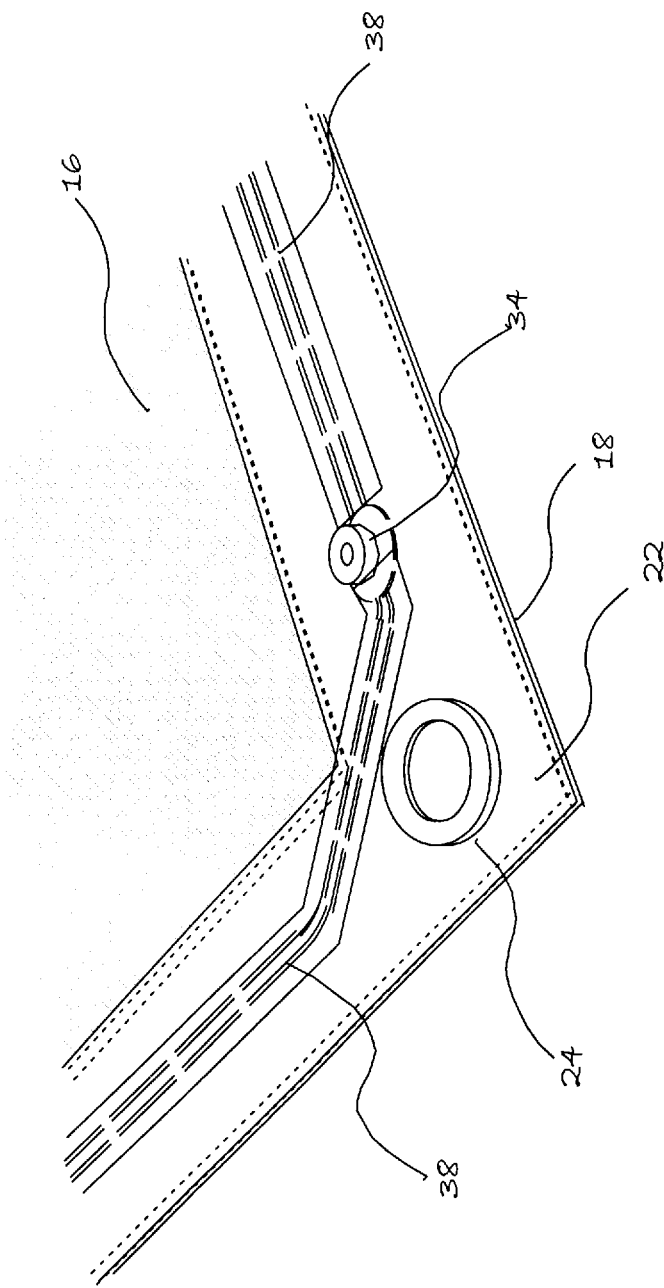
FIG. 9 is a partial view of a second embodiment of the present invention.

Emitter light sources 68 include, but not limited to, incandescent, fluorescent, or halogen-type lamps, visible or near IR (NIR) light-emitting diodes (LED), short, mid, or long wave IR (SWIR, MWIR, LWIR) emission sources, chemical light lights, electro-luminescent emitters and emitters in any other detectable wavelength. Emitter design can also include fiberoptic technology whereby multiple light sources on the slider 12 can be fed from a single emitter source. Emitters may be enhanced by focusing devices, such as the reflectors 66 concentrating the light in a more focused beam for enhanced illumination of the canopy. Other emitter augmentation may include diffusers 66 to disperse light into a more omni-directional manner and spacers to orient light in a more desirable direction As illustrated in FIGS. 4-5, a power source comprised of a replaceable or rechargeable battery cell or battery assembly 40 is provided. Power source retention means 42, including a battery holder 44, is positioned on the slider 12.

An electrical circuit is located on a printed circuit board 48. The printed circuit board 48 may be positioned juxtaposed the power source. The electrical circuit can provide a location for one or more of the emitter light sources 68, emitters function controls, emitter intensity controls, voltage regulation, high frequency oscillation circuits to yield light output with minimal battery drain, and activation and de-activation functions.

The power source 38, circuits and emitters are in electronically connected via connection wires 38. As illustrated in FIG. 3, a housing 36 is provided for the power source 40, power source retention means 42 and printed circuit board 48.

Activation circuit switching means provide a means of changing the state of the emitter light sources 68 and power source 40 circuit from a normally open circuit condition to a closed circuit condition upon deployment of the slider 12. The means could include, but are not limited to, an electrical switch/micro switch or electronic reed/magnet or Hall Effect switch arrangement capable of being activated by mechanical action associated with deployment of the slider 12, or an insulator between the power source 40 and one of its contacts, the removal allowing a closed circuit (ON) condition.

The system 30 is activated by several different modes, and upon a variety of conditions. For instance, the activation may commence upon deployment of the parachute 14 and/or the slider 12, or other mechanical activity that initiates the deployment of the parachute 14 and/or the slider 12 such as a ripcord or opening of the parachute containment device. One method is illustrated in FIGS. 4 and 5. As shown is FIG. 4, a short-rigged lanyard 52, having a first end and a second end, is connected at the first end to the edge binding 22 of the slider 12 at a pre-determined tie-off point 54. The second end of the lanyard 52 is attached to an activation tab 50. A folded portion 56 of the edged binding 22 is secured in ready status by attachment means 58, such as snaps. The activation tab 50 is in communication with the power source switching means rendering the switching means in the open circuit (OFF) condition. When the slider 12 is deployed the lanyard 52 moves in direction arrow C (FIG. 5), and the activation tab 50 is removed from the switching means causing a changed state to a closed circuit, (i.e., activated/ON) condition.

The means to activate the system 30 is not limited to mechanical activity. Means can include motion sensing (detecting the forces associated with opening of the parachute canopy via an on-board accelerometer), altitude sensing based upon an on-board barometric sensor, and photometric sensing to activate the system 30 in the absence of light.

The system 30 can be mounted on the slider 12 in a variety of manners. As illustrated in FIG. 10, the system 30 is integrally formed during the manufacturing process of fabricating a new slider. The system 30 is sewn into the edge binding 22 of the slider 12 when the slider 12 is manufactured.

A second embodiment of the system 30 is illustrated in FIG. 11. A carrier 80 is mounted to the upper surface of the edge binding 22 via carrier mounting means 82, such as hook and fastening means disposed on a lower surface of the carrier and the upper surface of the edge binding 22. The luminaire attachment means 34 and a wiring carrier 78 are sewn onto the slider 12 during assembly.

A third embodiment of the system is illustrated in FIG. 12. The system 30 and wiring carrier 78 are detachably mounted on the slider 12. Hook and fastening materials and/or snaps are integrally formed on the lower surface of the system 30 and mate with complimentary materials assembled on the slider 12.

Figure 13:
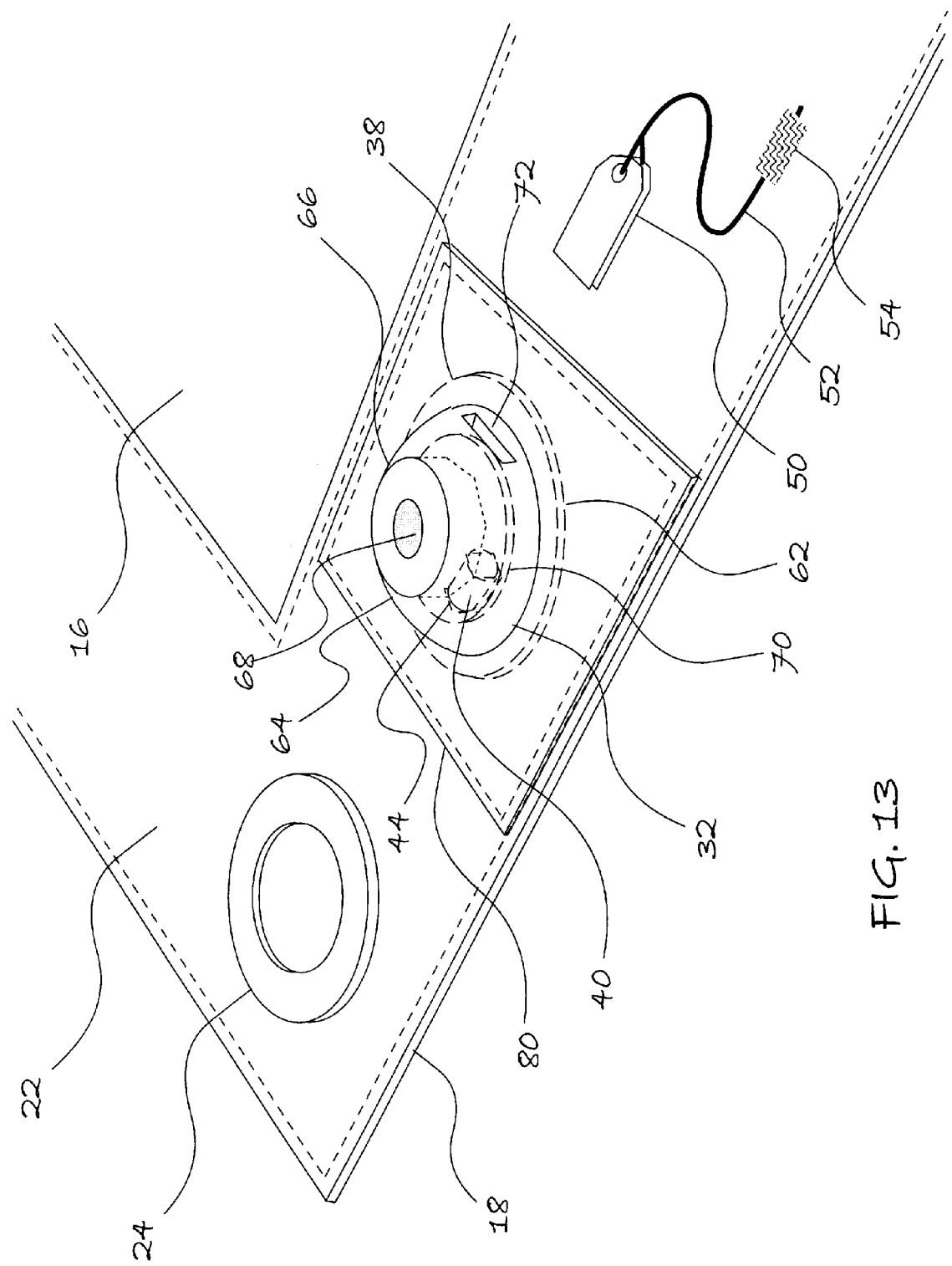
FIG. 13 is a partial view of a fourth embodiment of the present invention.

A fourth embodiment of the system is illustrated in FIG. 13. The system 30 is here a fully self-contained device comprising all the elements of the system in a single unit, one or more of which may be installed on the slider.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description only and should not be regarded as limiting the scope and intent of the invention.

We claim:

1. An illumination/marker system for mounting on a parachute slider component of specialized personnel or air delivery parachute systems which utilize the slider for the management of parachute opening and deployment, comprising in combination:

a parachute slider having an upper and a lower surface, being of a generally rectangular shape, and reinforced on its edges and corners to support a guide grommet at each corner through which parachute lines and parachute risers attached to the parachute canopy extend;

a system comprising at least one luminaire having a source of emission or radiation disposed therein, the system being disposed on the parachute slider;

a power source for the system;

means to activate the system; and means to attach the system to the parachute slider.

2. The system as set forth in claim 1, whereby the system has electronic circuitry to provide communication between the power source and the luminaire(s).

3. The system as set forth in claim 2, whereby the luminaire comprises the emission/radiation source and a housing incorporating a means for securing the luminaire to the system and the parachute slider.

4. The system as set forth in claim 3, whereby the means to activate the system comprises a short-rigged lanyard which relies on the extension of the slider from its stored condition to activate, whereby the lanyard has a first end and a second end, the first end connects to edge binding of the slider at a pre-determined location, and the second end of the lanyard connects to an activation tab in communication with power source switching means, and whereby upon deployment of the slider the system is activated.

5. The system as set forth in claim 4, whereby the sources of emission or radiation are light emitting diodes.

6. The system as set forth in claim 4, whereby the sources of emission or radiation are infrared emitters.

7. The system as set forth in claim 4, whereby the sources of emission or radiation are in any wavelength capable of detection and tracking by visual or any other means.

8. The system as set forth in claim 4, whereby the power source comprises a replaceable or rechargeable battery cell or battery pack.

9. The system as set forth in claim 3, whereby the means to activate the system is mechanical and linked to the unfolding and extension of the parachute slider from its stored condition to activate.

* * * * *